United States Patent
Neudorf et al.

(10) Patent No.: US 9,504,202 B2
(45) Date of Patent: Nov. 29, 2016

(54) HIGH CLEARANCE MOWER HITCH

(71) Applicant: Highline Manufacturing Ltd., Vonda (CA)

(72) Inventors: Blake Neudorf, Vonda (CA); Montgomerie Summach, Vonda (CA); Gerard Bourgault, St. Brieux (CA); Mark Cresswell, St. Brieux (CA)

(73) Assignee: Highline Manufacturing, LTD., Vonda (CA)

( * ) Notice: Subject to any disclaimer, the term of this patent is extended or adjusted under 35 U.S.C. 154(b) by 127 days.

(21) Appl. No.: 14/522,205

(22) Filed: Oct. 23, 2014

(65) Prior Publication Data

US 2016/0113201 A1    Apr. 28, 2016

(51) Int. Cl.
*A01D 67/00* (2006.01)
*A01D 75/30* (2006.01)
*A01B 69/00* (2006.01)
*A01D 34/66* (2006.01)
*A01D 34/80* (2006.01)

(52) U.S. Cl.
CPC .......... *A01D 67/005* (2013.01); *A01B 69/003* (2013.01); *A01D 34/661* (2013.01); *A01D 75/30* (2013.01); *A01D 34/80* (2013.01)

(58) Field of Classification Search
CPC combination set(s) only.
See application file for complete search history.

(56) References Cited

U.S. PATENT DOCUMENTS

| 2,316,397 | A | * | 4/1943 | Briscoe | A01B 59/042 172/206 |
| 4,442,658 | A | * | 4/1984 | Cartner | A01D 75/303 56/11.9 |
| 5,511,368 | A |   | 4/1996 | Kocher | |
| 6,625,964 | B2 | * | 9/2003 | McLeod | A01B 59/042 172/677 |
| 6,854,250 | B2 |   | 2/2005 | Boyko | |
| 6,877,758 | B2 | * | 4/2005 | Colistro | B60D 1/075 180/14.4 |
| 7,055,618 | B2 | * | 6/2006 | Ehrhart | A01B 71/06 172/449 |
| 7,334,645 | B2 | * | 2/2008 | Stevenson | A01D 34/86 172/677 |
| 7,775,024 | B2 |   | 8/2010 | Boyko | |
| 2005/0034438 | A1 | * | 2/2005 | Burke | A01D 75/306 56/6 |

* cited by examiner

*Primary Examiner* — Alicia Torres
(74) *Attorney, Agent, or Firm* — Michael A. Bondi; Moss & Barnett

(57) ABSTRACT

A rotary mower has a center mower deck and a hitch arm assembly adapted at a front end for connection to a tractor drawbar. A hydraulic pump is mounted on the hitch arm assembly and connected to a hydraulic motor mounted on the center mower. An upward arm section of the hitch arm assembly extends upward from a front portion of the hitch arm assembly to provide a desired clearance distance between a middle arm section of the hitch arm assembly and the ground, and a downward arm section of the hitch arm assembly extends downward from the middle arm section to a rear end of the hitch arm assembly which is pivotally connected to the mower deck about a hitch pivot axis oriented horizontally and perpendicular to the operating travel direction. The hitch pivot axis is located at a vertical position below top edges of the front wheels.

22 Claims, 4 Drawing Sheets

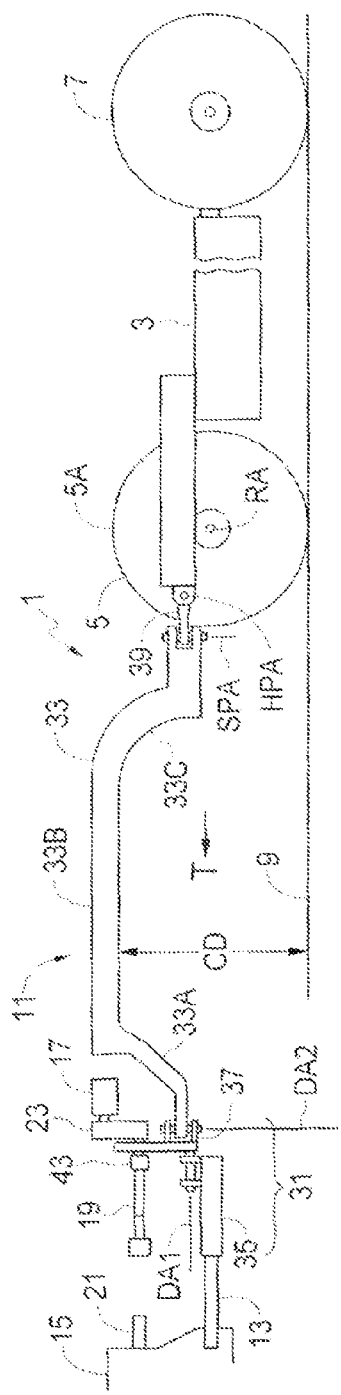
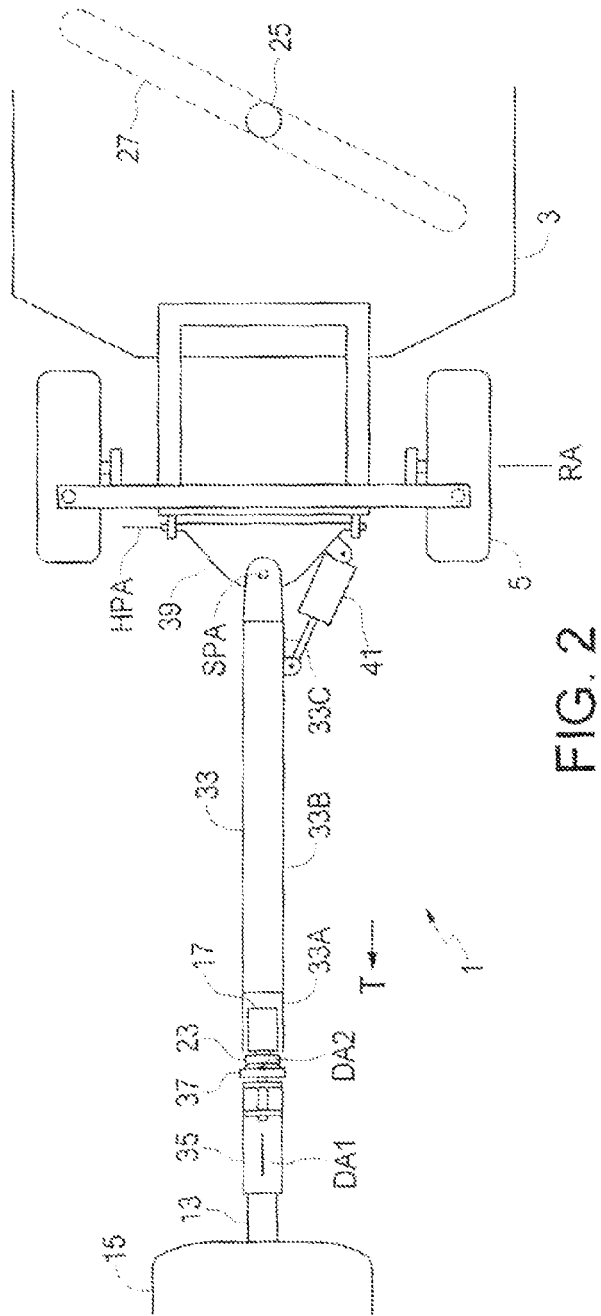
FIG. 1
FIG. 2

HIGH CLEARANCE MOWER HITCH

FIELD OF THE INVENTION

This disclosure relates to the field of rotary mowers and in particular a high clearance hitch for such a mower to facilitate passing over variable terrain and obstacles such as road approaches across ditches.

BACKGROUND OF THE INVENTION

Typical rotary mowers have a horizontally oriented mower deck mounted on wheels for movement along the ground and a horizontally oriented rotating blade mounted under the deck. Wider rotary mowers typically include a center deck with right and left wing decks pivotally attached to the center deck about horizontal wing pivot axes oriented substantially in alignment with an operating travel direction of the mower. For transport the wings are pivoted up about the wing pivot axes to a generally vertical transport position. One or more rotating blades are mounted under each wing deck.

These wider rotary mowers are typically supported on front and rear wheels and are towed by a tractor connected to the front end of a hitch arm extending forward from the mower. The blades are commonly driven by the power take-off of the towing tractor connected by driveshafts to gearboxes mounted on the tops of the decks for example as shown in U.S. Pat. Nos. 7,775,024 and 6,854,250 to Boyko. It is also known to drive the blades with hydraulic motors powered by the tractor hydraulic supply or by a separate hydraulic pump mounted on the mower and driven by the tractor's power take off, for example as disclosed in U.S. Pat. No. 5,511,368 to Kocher.

Such wider rotary mowers are often used for cutting on ditches alongside roads. Such ditches are sloped and are also are periodically crossed by approaches which allow access to the road across the ditch. To allow the towing tractor to drive on the road surface with the mower pulled behind in an offset position on the sloped ditch surface, the hitch arms of the Boyko '024 and '250 mowers pivot with respect to the mower so the mower trails the tractor in the desired offset position. The Kocher mower can be operated while located in a variety of positions relative to the tractor as well.

Obstructions, such as road approaches in the ditches, can be quite steep and sharply sloped. The wider mowers usually used for ditch cutting have quite long hitch members extending forward from the mower to the tractor to provide for sufficient offset. These hitch arms often drag on these obstructions as the tractor moves sharply up and down relative to the mower. On both of the Boyko '024 and '250 mowers, the hitch extends upward from the tractor attachment end and then rearward and down to the mower providing a raised hitch that provides increased clearance thus reducing the contact of the hitch with approaches and the like.

SUMMARY OF THE INVENTION

The present disclosure provides a hitch apparatus for a rotary mower that overcomes problems in the prior art.

In a first embodiment the present disclosure provides a rotary mower apparatus comprising a center mower deck mounted on front and rear wheels for movement along a ground surface in an operating travel direction, and a hitch arm assembly adapted at a front end thereof for connection to a drawbar of a tractor. A hydraulic pump is mounted on the hitch arm assembly, and a pump driveshaft is adapted at a front end thereof for attachment to a power take-off of the tractor, and is connected at a rear end thereof to the hydraulic pump. A hydraulic motor mounted on the center mower deck is connected to rotate a blade under the center mower deck, and the hydraulic motor is connected to receive pressurized hydraulic fluid from the hydraulic pump. An upward arm section of the hitch arm assembly extends upward from a front portion of the hitch arm assembly to provide a desired clearance distance between a middle arm section of the hitch arm assembly and the ground surface, and a downward arm section of the hitch arm assembly extends downward from the middle arm section to a rear end of the hitch arm assembly. The rear end of the hitch arm assembly is pivotally connected to the mower deck about a hitch pivot axis oriented substantially horizontally and perpendicular to the operating travel direction, and the hitch pivot axis is located at a vertical position below top edges of the front wheels.

In a second embodiment the present disclosure provides a rotary mower apparatus comprising a center mower deck mounted on front and rear wheels for movement along a ground surface in an operating travel direction. A drawbar assembly is adapted at a front end thereof for connection to a drawbar of a tractor in a substantially fixed position with respect to the drawbar, and a rear portion of the drawbar assembly is pivotally attached to a front end of a rigid hitch arm member about a substantially horizontal first drawbar pivot axis oriented substantially parallel to the operating travel direction, and about a substantially vertical second drawbar pivot axis. A hydraulic pump is mounted on the drawbar assembly, and a pump driveshaft adapted at a front end thereof for attachment to a power take-off of the tractor is connected at a rear end thereof to the hydraulic pump. A hydraulic motor mounted on the center mower deck is connected to rotate a blade under the mower deck, and is connected to receive pressurized hydraulic fluid from the hydraulic pump. A forward arm section of the hitch arm member extends upward from the front end of the hitch arm member to provide a desired clearance distance between a middle arm section of the hitch arm member and the ground surface, and a rear arm section of the hitch arm member extends downward from the middle section to a rear end of the hitch arm member. The rear end of the hitch arm member is pivotally connected to the mower deck about a hitch pivot axis oriented substantially horizontally and perpendicular to the operating travel direction and the hitch pivot axis is located at a vertical position below top edges of the front wheels.

The rotary mower apparatus of the present disclosure provides a high clearance hitch assembly with a low and forward pull point on the mower deck that reduces downward forces on the front wheels which tend to push the front wheels down into soft ground. A hydraulic drive system for the mower blades provides a low cost, low maintenance drive that transfers power simply from the power take-off of the towing tractor to the mower blades through several pivot axes.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic side view of an embodiment of a rotary mower apparatus of the present disclosure.

FIG. 2 is a schematic top view of the embodiment of FIG. 1.

DETAILED DESCRIPTION OF THE INVENTION

Figure 3:
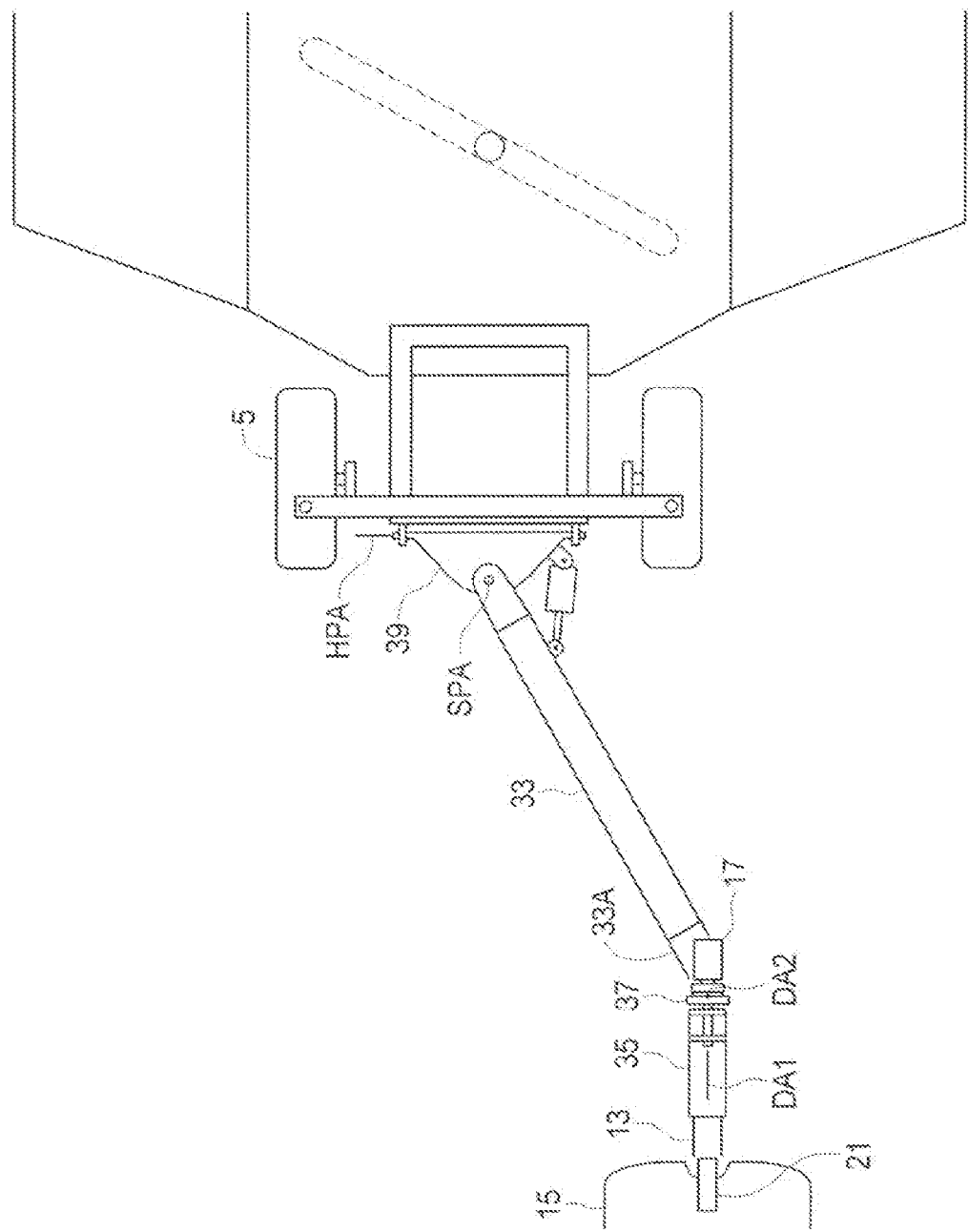
FIG. 3 is a schematic top view of the embodiment of FIG. 1 with the hitch arm assembly pivoted with respect to the mower deck to place the mower deck in an offset position with respect to the towing tractor.

FIGS. 1 and 2 schematically illustrate an embodiment of a rotary mower apparatus 1 of the present disclosure. The apparatus 1 comprises a center mower deck 3 mounted on front and rear wheels 5, 7 for movement along a ground surface 9 in an operating travel direction T. A hitch arm assembly 11 is adapted at a front end thereof for connection to a drawbar 13 of a tractor 15. The left front wheel and the front wheel mounting frame have been removed in FIG. 1 to allow illustration of the connection of the hitch arm assembly 11 to the mower deck 3. Similarly the pump driveshaft, hydraulic reservoir and cooling system, and the right and left wing decks have been removed from FIG. 2.

A hydraulic pump 17 is mounted on the hitch arm assembly 11, and a pump driveshaft 19 is adapted at a front end thereof for attachment to a power take-off 21 of the tractor 15, and is connected at a rear end thereof to the hydraulic pump. In the illustrated apparatus 1, the pump driveshaft 19 is connected at the rear end thereof to the hydraulic pump 17 through a gearbox 23 such that the rotational speed of the pump 17 can be increased if necessary. The gearbox 23 is fixed to the rear drawbar section 37 at an elevation selected such that the pump driveshaft 19 is substantially horizontal when connected to the tractor power take-off 21, and the hydraulic pump 17 is then attached to the gearbox 23.

A hydraulic motor 25 is mounted on the center mower deck 3 and is connected to rotate a blade 27 under the center mower deck 3. The hydraulic motor 25 is connected to receive pressurized hydraulic fluid from the hydraulic pump 17 through conduits (not shown) as is known in the art.

The hitch arm assembly 11 is configured to provide a desired clearance distance CD between the central portion of the hitch arm assembly 11 and the ground surface 9 to reduce the occurrence of the hitch arm assembly 11 contacting the ground, as when crossing road approaches when mowing road ditches. In the illustrated apparatus 1 the hitch arm assembly 11 comprises a drawbar assembly 31 at a front end thereof pivotally connected to a rigid hitch arm member 33 which in turn is pivotally connected at a rear end thereof to the mower deck 3 about a hitch pivot axis HPA oriented substantially horizontally and perpendicular to the operating travel direction T.

The drawbar assembly 31 comprises a front drawbar section 35 adapted at a front end thereof for connection to the drawbar 13 in a substantially fixed position with respect to the drawbar 13. For example the drawbar 13 can slide into a sleeve in the front drawbar section 35, such that the front drawbar section 35 does not pivot with respect to the drawbar 13. The drawbar assembly 31 further comprises a rear drawbar section 37 pivotally connected at a front end thereof to the front drawbar section 35 about a substantially horizontal first drawbar pivot axis DA1 oriented substantially parallel to the operating travel direction T. The rear drawbar section 37 is then pivotally connected at a rear end thereof to the front end of a rigid hitch arm member 33 about a substantially vertical second drawbar pivot axis DA2.

Thus the rigid hitch arm member 33 can swing laterally about the second drawbar pivot axis DA2, and can also pivot with respect to the tractor 15 about the first drawbar pivot axis DA1 to accommodate varying terrain. The rear drawbar section 37 pivots with respect to the tractor 15 only about the first drawbar pivot axis DA1, while the front drawbar section 35 is substantially fixed with respect to the tractor 15. The first drawbar pivot axis DA1 intersects the second drawbar pivot axis DA2 to align the towing forces on the drawbar 13.

The hitch arm member 33 comprises upward arm section 33A sloping up from the front end of the hitch arm member 33, a middle arm section 33B extending generally rearward from the top end of the upward arm section 33A, and a downward arm section 33C sloping downward from the rear end of the middle arm section 33B to the connection to the mower deck 3 at the hitch pivot axis HPA. The hitch pivot axis HPA is located at a vertical position below top edges 5A of the front wheels 5, and in the illustrated apparatus the hitch pivot axis HPA is located between the top edges 5A of the front wheels 5 and the rotational axis RA of the front wheels 5, and forward of the rotational axis RA of the front wheels.

In the illustrated apparatus 1, the rear end of the hitch arm assembly 11 at the rear end of the hitch arm member 33 is pivotally connected to the mower deck 3 by a pivot plate 39. The pivot plate 39 is pivotally connected to the mower deck 3 about the hitch pivot axis HPA and the rear end of the hitch arm member 33 is pivotally connected to the pivot plate 39 about a substantially vertical swing pivot axis SPA. An actuator, such as a hydraulic cylinder 41, is operative to pivot the hitch arm assembly 11 about the swing pivot axis SPA to a desired offset position for conveniently mowing ditches and like operations, as schematically illustrated in FIG. 3.

Thus in the apparatus 1, the front drawbar section 35 is fixed with respect to the drawbar 13, and the rear drawbar section 37 can pivot only with respect to the drawbar about the first drawbar pivot axis DA1, a fairly small rocking motion in most terrain, such that the pump driveshaft 19 remains substantially level and aligned with the gearbox 23, reducing strain on the universal joints 43 at the ends of the pump driveshaft 19. As can be seen in FIG. 3 the upward arm section 33A passes rearward of the hydraulic pump 17 when the hitch arm member 33 pivots about the second drawbar pivot axis DA2, and the pump 17 stays substantially aligned with the tractor power take-off 21.

Figure 4:
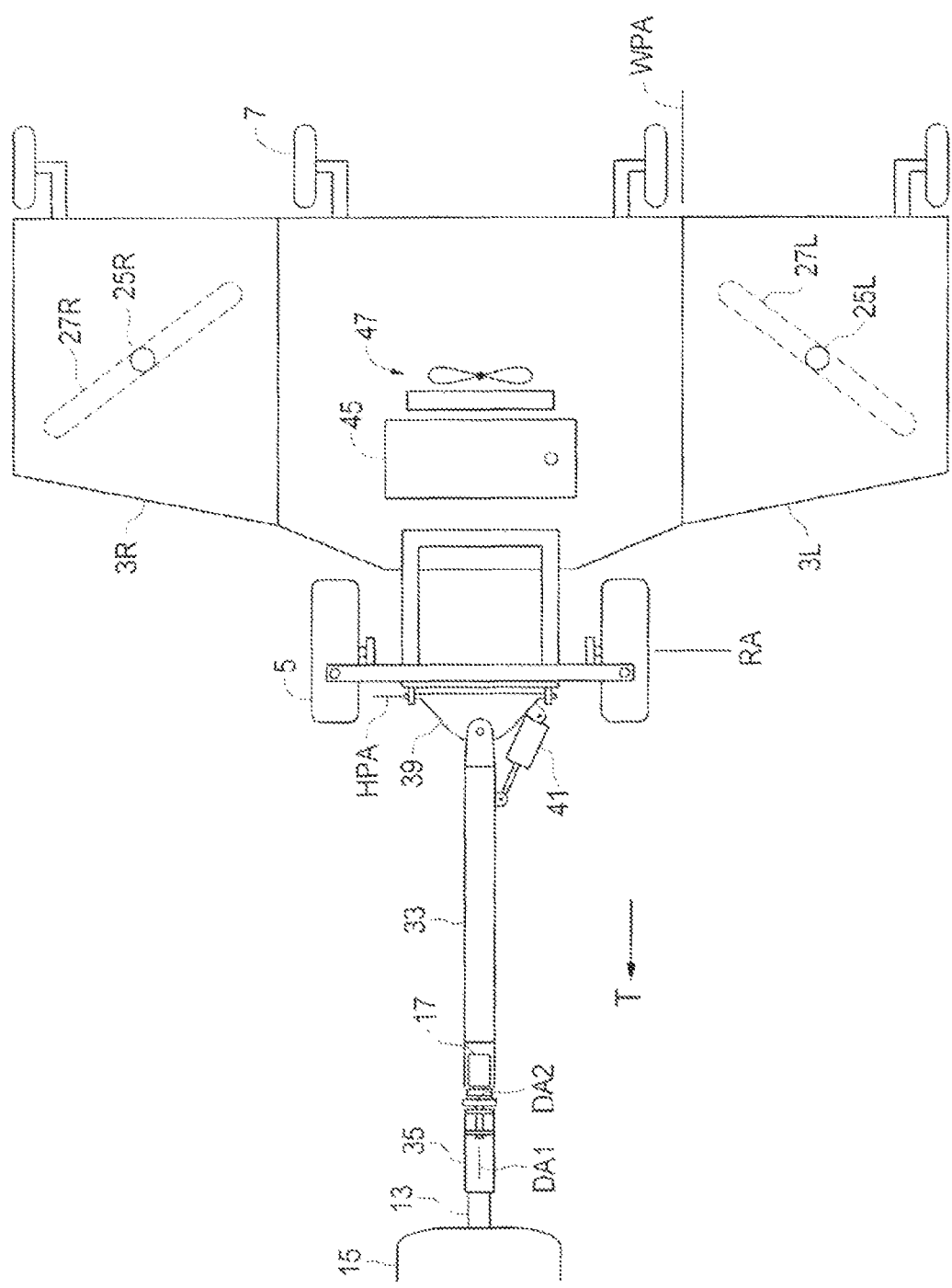
FIG. 4 is a schematic top view of the embodiment of FIG. 1 showing the right and left wing decks, hydraulic reservoir, and hydraulic fluid cooling system.

FIG. 4 schematically illustrates the apparatus 1 with the typical right and left wing mower decks 3R, 3L pivotally attached to the center mower deck 3 about corresponding right and left wing pivot axes WPA oriented substantially parallel to the operating travel direction T. Right and left hydraulic motors 25R, 25L are connected to receive pressurized hydraulic fluid from the hydraulic pump 17 and drive blades 27R, 27L under the corresponding right and left wing decks 3R, 3L.

A hydraulic fluid reservoir 45 is mounted on the center mower deck 3 and connected to supply hydraulic fluid to the hydraulic pump 17 through conventional conduits which are known in the art and not illustrated. A cooling system 47 is operative to cool the hydraulic fluid.

Figure 5:
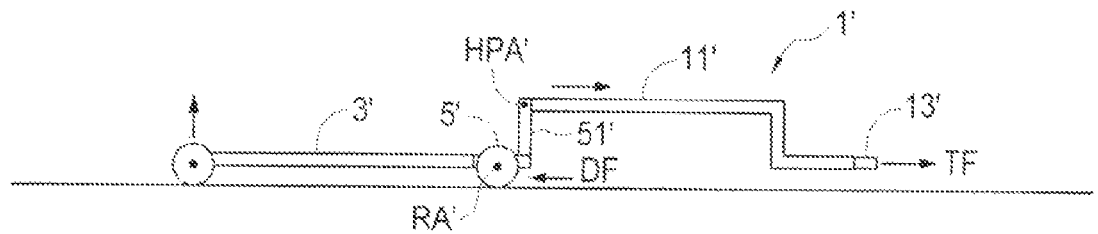
FIG. 5 is a schematic side view of a rotary mower apparatus of the prior art with a high clearance hitch assembly showing the forces exerted thereon in operation.
Figure 6:
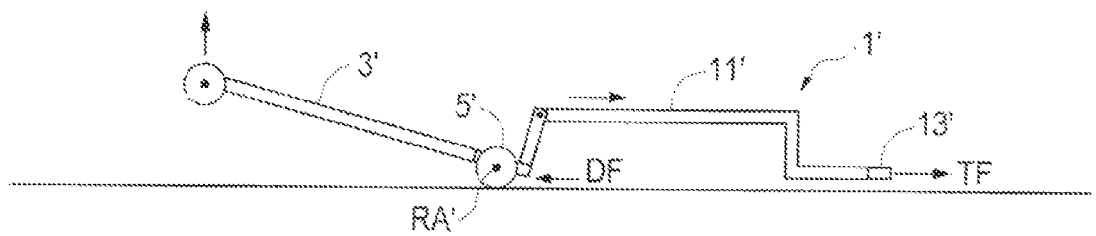
FIG. 6 is a side view of the apparatus of FIG. 5 with rear wheels moving up in response to torque exerted on the elevated hitch pivot axis.

FIGS. 5 and 6 schematically illustrate a rotary mower apparatus 1' of the prior art with a high clearance hitch. The hitch arm assembly 11' is pivotally attached to the mower about hitch pivot axis HPA', at a location significantly elevated above the front wheels 5'. When the drag force DF on the front wheels 5' increases, such as when encountering soft ground, the towing force TF is exerted at the hitch pivot axis HPA' and causes the hitch arm assembly 11' to pivot on the elevated hitch pivot axis HPA' and exert a torque tending to rotate the hitch mount post 51' about the rotational axis RA' of the front wheels 5'. This torque tends to raise the rear end of the mower deck 3', putting added weight on the front wheels 5', and sinking the front wheels 5' farther into the soft ground.

Figure 7:
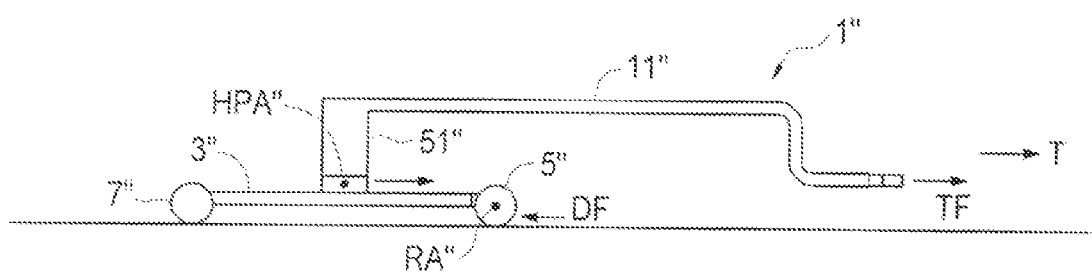
FIG. 7 is a schematic side view of a different rotary mower apparatus of the prior art with a high clearance hitch assembly showing the forces exerted thereon in operation.

Similarly FIG. 7 schematically illustrates a hitch arrangement of a different type of rotary mower apparatus 1" of the prior art with a high clearance hitch. Here the hitch arm assembly 11" is attached to the mower deck 3" about a hitch pivot axis HPA" that is above the center of the mower deck 3", such that the tow force TF essentially pulls the rear wheels 7" and pushes the front wheels 5" in the operating travel direction T. This arrangement tends to push the front wheels 5" downward in soft ground, increasing the drag forces DF.

Figure 8:
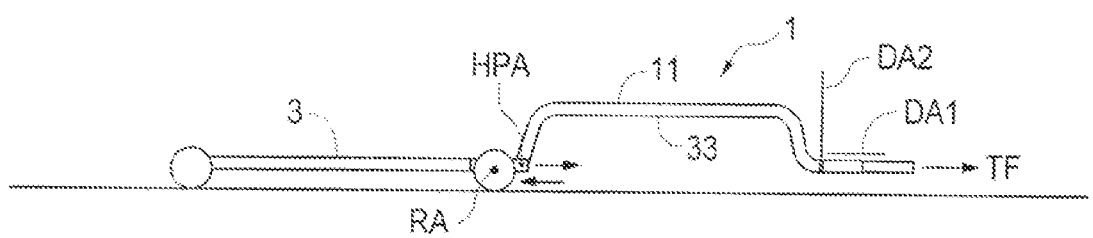
FIG. 8 is a schematic side view of the embodiment of FIG. 1 showing the forces exerted thereon in operation.

In contrast in the rotary mower apparatus 1 of the present invention, shown in FIG. 8, the towing force TF is exerted at the hitch pivot axis HPA which is very low and forward of the rotational axis RA of the front wheels 5. The mower deck 3 can pivot in three directions about axes HPA, DA1, and DA2 but the hitch arm member 33 of the hitch arm assembly 11 is rigid down to the hitch pivot axis HPA, locating the pull point low and forward where there is little torque about the rotational axis RA of the front wheels that would tend to drive the front wheels 5 down into soft ground.

The rotary mower apparatus 1 of the present disclosure pulls the mower from a low point to reduce downward forces on the front wheels 5 that tend to push the wheels down into soft ground and cause the mower to become stuck. The hitch arm assembly 11 provides high clearance to reduce the occurrence of contact between the hitch and the ground during travel over sharp vertical obstructions. The hydraulic drive system avoids complicated, expensive, and high maintenance mechanical drive lines with multiple gear boxes that would be necessary to provide mechanical drive along the several pivot axes between the power take-off 21 of the tractor and the blades 27 of the apparatus 1.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A rotary mower apparatus comprising:
a center mower deck mounted on front and rear wheels for movement along a ground surface in an operating travel direction;
a hitch arm assembly adapted at a front end thereof for connection to a drawbar of a tractor;
a hydraulic pump mounted on the hitch arm assembly, and a pump driveshaft adapted at a front end thereof for attachment to a power take-off of the tractor, and connected at a rear end thereof to the hydraulic pump;
a hydraulic motor mounted on the center mower deck and connected to rotate a blade under the center mower deck, the hydraulic motor connected to receive pressurized hydraulic fluid from the hydraulic pump;
wherein an upward arm section of the hitch arm assembly extends upward from a front portion of the hitch arm assembly to provide a desired clearance distance between a middle arm section of the hitch arm assembly and the ground surface, and a downward arm section of the hitch arm assembly extends downward from the middle arm section to a rear end of the hitch arm assembly;
wherein the rear end of the hitch arm assembly is pivotally connected to the mower deck about a hitch pivot axis oriented substantially horizontally and perpendicular to the operating travel direction; and
wherein the hitch pivot axis is fixed with respect to the mower deck and located forward of the rotational axis of the front wheels at a vertical position that is closer to a rotational axis of the front wheels than to top edges of the front wheels.

2. The apparatus of claim 1 wherein the rear end of the hitch arm assembly is pivotally connected to the mower deck by a pivot plate, and wherein the pivot plate is pivotally connected to the mower deck about the hitch pivot axis, and the rear end of the hitch arm assembly is pivotally connected to the pivot plate about a substantially vertical swing pivot axis.

3. The apparatus of claim 2 further comprising an actuator operative to pivot the hitch arm assembly about the swing pivot axis to a desired offset position.

4. The apparatus of claim 1 wherein the hitch arm assembly comprises a drawbar assembly at a front end thereof, the drawbar assembly comprising a front drawbar section adapted at a front end thereof for connection to the drawbar, and a rear drawbar section pivotally connected at a front end thereof to the front drawbar section and pivotally connected at a rear end thereof to a front end of a rigid hitch arm member, and wherein the hitch arm member comprises the upward arm section, the middle arm section, and the downward arm section.

5. The apparatus of claim 4 wherein the front drawbar section is adapted at the front end thereof for connection to the drawbar in a substantially fixed position with respect to the drawbar, and the front drawbar section is pivotally connected at a rear end thereof to the front end of the rear drawbar section about a substantially horizontal first drawbar pivot axis oriented substantially parallel to the operating travel direction, and wherein the rear drawbar section is pivotally connected to the front end of the hitch arm member about a substantially vertical second drawbar pivot axis.

6. The apparatus of claim 5 wherein the first drawbar pivot axis intersects the second drawbar pivot axis.

7. The apparatus of claim 5 wherein the hydraulic pump is mounted on the rear drawbar section.

8. The apparatus of claim 7 wherein the pump driveshaft is connected at the rear end thereof to the hydraulic pump through a gearbox.

9. The apparatus of claim 8 wherein the gearbox is fixed to the rear drawbar section at an elevation selected such that the pump driveshaft is substantially horizontal, and wherein the hydraulic pump is attached to the gearbox.

10. The apparatus of claim 7 wherein the upward arm section passes rearward of the hydraulic pump when the hitch arm member pivots about the second drawbar pivot axis.

11. The apparatus of claim 1 further comprising right and left wing mower decks pivotally attached to the center mower deck about corresponding right and left wing pivot axes oriented substantially parallel to the operating travel direction, and right and left hydraulic motors connected to receive pressurized hydraulic fluid from the hydraulic pump and driving blades under the corresponding right and left wing decks.

12. The apparatus of claim 1 comprising a hydraulic fluid reservoir mounted on the center mower deck and connected to supply hydraulic fluid to the hydraulic pump, and a cooling system operative to cool the hydraulic fluid.

13. A rotary mower apparatus comprising:
a center mower deck mounted on front and rear wheels for movement along a ground surface in an operating travel direction;
a drawbar assembly adapted at a front end thereof for connection to a drawbar of a tractor in a substantially fixed position with respect to the drawbar, and with a rear portion of the drawbar assembly pivotally attached to a front end of a rigid hitch arm member about a substantially horizontal first drawbar pivot axis oriented substantially parallel to the operating travel direction, and about a substantially vertical second drawbar pivot axis;
a hydraulic pump mounted on the drawbar assembly, and a pump driveshaft adapted at a front end thereof for attachment to a power take-off of the tractor, and connected at a rear end thereof to the hydraulic pump;
a hydraulic motor mounted on the center mower deck and connected to rotate a blade under the mower deck, the hydraulic motor connected to receive pressurized hydraulic fluid from the hydraulic pump;
wherein a forward arm section of the hitch arm member extends upward from the front end of the hitch arm member to provide a desired clearance distance between a middle arm section of the hitch arm member and the ground surface, and a rear arm section of the hitch arm member extends downward from the middle section to a rear end of the hitch arm member;
wherein the rear end of the hitch arm member is pivotally connected to the mower deck about a hitch pivot axis oriented substantially horizontally and perpendicular to the operating travel direction; and
wherein the hitch pivot axis is fixed with respect to the mower deck and located forward of the rotational axis of the front wheels at a vertical position that is closer to a rotational axis of the front wheels than to top edges of the front wheels.

14. The apparatus of claim 13 wherein the rear end of the hitch arm member is pivotally connected to the mower deck by a pivot plate, and wherein the pivot plate is pivotally connected to the mower deck about the hitch pivot axis, and the rear end of the hitch arm member is pivotally connected to the pivot plate about a substantially vertical swing pivot axis.

15. The apparatus of claim 14 further comprising an actuator operative to pivot the hitch arm member about the swing pivot axis to a desired offset position.

16. The apparatus of claim 13 wherein the drawbar assembly comprises a front drawbar section adapted at a front end thereof for connection to the drawbar, and a rear drawbar section pivotally connected at a front end thereof to the front drawbar section about the first drawbar axis and pivotally connected at a rear end thereof to the front end of the hitch arm member about the second drawbar axis.

17. The apparatus of claim 16 wherein the hydraulic pump is mounted on the rear drawbar section.

18. The apparatus of claim 17 wherein the pump driveshaft is connected at the rear end thereof to the hydraulic pump through a gearbox and wherein the hydraulic pump is attached to the gearbox.

19. The apparatus of claim 18 wherein the gearbox is mounted on the rear drawbar section at an elevation selected such that the pump driveshaft is substantially horizontal, and the hydraulic pump is mounted on the gearbox.

20. The apparatus of claim 16 the upward arm section passes rearward of the hydraulic pump when the hitch arm member pivots about the second drawbar pivot axis.

21. The apparatus of claim 13 further comprising right and left wing mower decks pivotally attached to the center mower deck about corresponding right and left wing pivot axes oriented substantially parallel to the operating travel direction, and right and left hydraulic motors connected to receive pressurized hydraulic fluid from the hydraulic pump, the right and left hydraulic motors driving blades under the corresponding right and left wing decks.

22. The apparatus of claim 13 comprising a hydraulic fluid reservoir mounted on the center mower deck and connected to supply hydraulic fluid to the hydraulic pump, and a cooling system operative to cool the hydraulic fluid.

* * * * *